United States Patent [19]

Hermann

[11] Patent Number: 4,789,419
[45] Date of Patent: Dec. 6, 1988

[54] APPARATUS FOR APPLYING DECORATIVE ELEMENTS

[75] Inventor: Walter Hermann, Hard, Austria
[73] Assignee: Oehler AG, Au, Switzerland
[21] Appl. No.: 34,158
[22] PCT Filed: Jul. 10, 1986
[86] PCT No.: PCT/EP86/00410
  § 371 Date: Mar. 16, 1987
  § 102(e) Date: Mar. 16, 1987
[87] PCT Pub. No.: WO87/00403
  PCT Pub. Date: Jan. 29, 1987

[30] Foreign Application Priority Data
  Jul. 17, 1985 [CH] Switzerland .......... 3103/85

[51] Int. Cl.⁴ .................... B65B 27/08
[52] U.S. Cl. ................ 156/499; 156/379; 156/552; 156/556; 156/583.4
[58] Field of Search ........... 156/552, 571, DIG. 31, 156/499, 583.4, 581, 379, 556; 227/41, 48, 49, 143; 63/28, DIG. 1

[56] References Cited

U.S. PATENT DOCUMENTS 2,260,572 10/1941 LaRussa .
2,747,185 5/1956 Effgen .
3,129,130 4/1964 Lerner .
3,338,497 8/1967 Italiano .
3,381,871 5/1968 Chalfin .
3,583,451 6/1971 Dixon .
3,920,130 11/1975 Edgett .
4,564,412 1/1986 Oberdorf ............... 156/484

FOREIGN PATENT DOCUMENTS 0118856 9/1984 European Pat. Off. .
2517339 10/1976 Fed. Rep. of Germany .
3333428 4/1985 Fed. Rep. of Germany .
1041611 10/1953 France .
1123525 9/1956 France .
2136415 12/1972 France .
0565692 8/1975 Switzerland .
0570320 10/1975 Switzerland .
1584552 2/1981 United Kingdom .

Primary Examiner—David Simmons
Attorney, Agent, or Firm—William R. Hinds

[57] ABSTRACT

The apparatus for applying decorative elements (47) to textile and non-textile flat articles (49) comprises a movable gripper (9) whose axially displaceable punch member (15) is connected to a suction source. The decorative elements (47) are taken by the punch member (15) from the shaker device (23) or with a disc (29) provided with a suction opening and pressed against the flat article (49). The adhesive is melted either by a heating plate (45) arranged beneath the flat article (49) or by a heating element at the punch member (15) and/or in the disc (29).

3 Claims, 2 Drawing Sheets

APPARATUS FOR APPLYING DECORATIVE ELEMENTS

The subject-matter of the invention is an apparatus for applying decorative elements which are covered with a hot adhesive on one side to a flat article lying on a table, comprising a heating element for heating the hot adhesive and a means for pressing the decorative element onto the flat article.

Articles of clothing for festive occasions and the robes of circus performers or variety artistes frequently bear decorative elements, which are referred to as stones, consisting of ground glass or material similar to mother of pearl. Depending on the particular use involved, a few up to some hundreds of stone are stuck on to an article of clothing. The decorative elements which are generally of a part-spherical shape are applied to the flat contact surface with a hot adhesive which softens under the effect of heat and which provides an insoluble connection to the article to which it is applied, being in most cases a flat textile article.

It is known for the decorative elements to be individually applied by hand to the material which is to be decorated and which lies on a heating plate, and for the decorative elements to be pressed thereagainst either individually with a rod or overall with a plate.

That work is very costly and irksome, particularly when the individual decorative elements are only about 1 millimetre in diameter and consequently can scarcely be held by hand.

It is also known for the decorative elements firstly to be applied to an adhesive carrier foil, in that case the decorative elements forming a pattern. The decorative elements which adhere to the carrier foil can then be jointly transferred on to the material to be decorated, using an iron.

That process is suitable only for applying a large number of decorative elements forming an ornament. The costs involved for applying individual decorative elements are excessively high and in addition, when dealing with materials of synthetic fibres, there is the danger that the material may shrink or form undulations as a result of the heat which is given off by the heating plate or by the iron.

The object of the present invention is that of overcoming those disadvantages and providing an apparatus with which the decorative elements can be applied inexpensively, quickly and accurately to a predetermined location.

The invention attains those objects generally by an apparatus of the type previously mentioned having the combination of the following features: a gripper with a punch member, the gripper being arranged above the table on a horizontal axis and being pivotable by means of a drive member into an upper and a lower limit position, a shaker device for isolating the individual decorative elements, and a rotatable disc which is arranged between the tip of the punch member in the upper limit position of the gripper and the shaker device and which engages into the shaker device and which has a bore terminating at its periphery and communicating with a suction source for sucking thereagainst and holding thereat a decorative element which is isolated in the shaker device, whereby a decorative element can be guided from the shaker device to the tip of the punch member by a rotary movement of the disc and from there can be guided onto a flat article by pivotal movement of the gripper into the lower limit position. In accordance with the invention, a heating element with a heating plate is arranged under the gripper in an opening in the table. The surface of the heating plate may lie below the surface of the table, and a light source may be arranged either in the opening or on a cantilever arm carrying the gripper.

It is now possible for decorative elements to be automatically taken individually from a storage means and applied to the material at a desired location. In that operation, the material is heated only precisely at the location of contact with the decorative element. It is therefore also possible to decorate voluminous materials such as velvet with decorative elements without visible pressure areas occurring outside the decorative elements.

The invention will be described in greater detail with reference to an illustrated embodiment. In the drawings.

Figure 1:
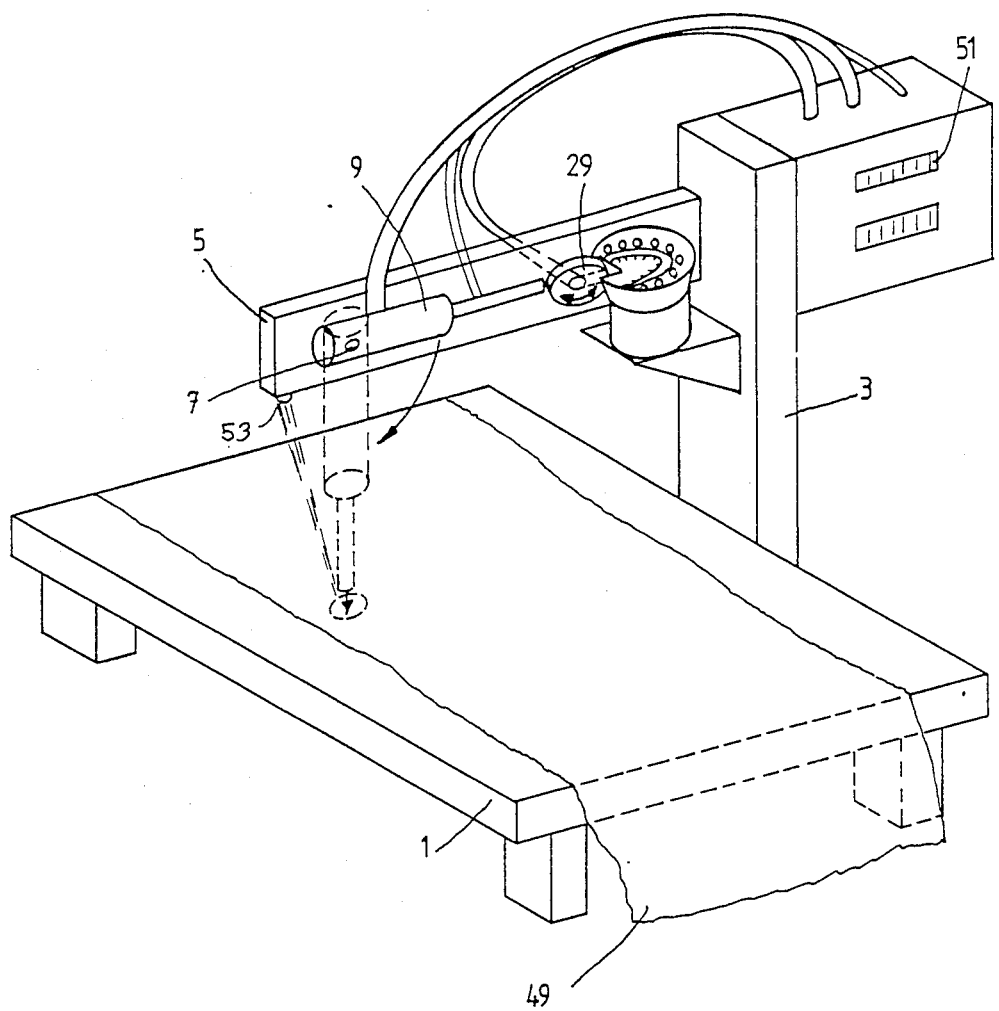
FIG. 1 is a partly cut-away perspective view of the apparatus.
Figure 2:
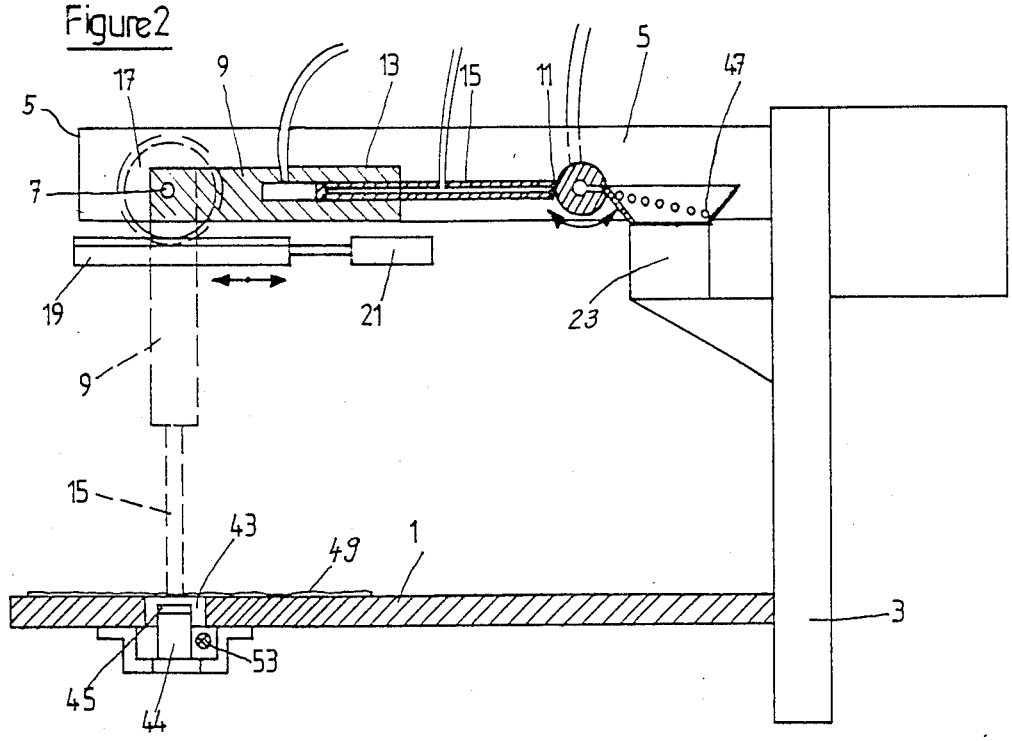
FIG. 2 is a plan view.
Figure 3:
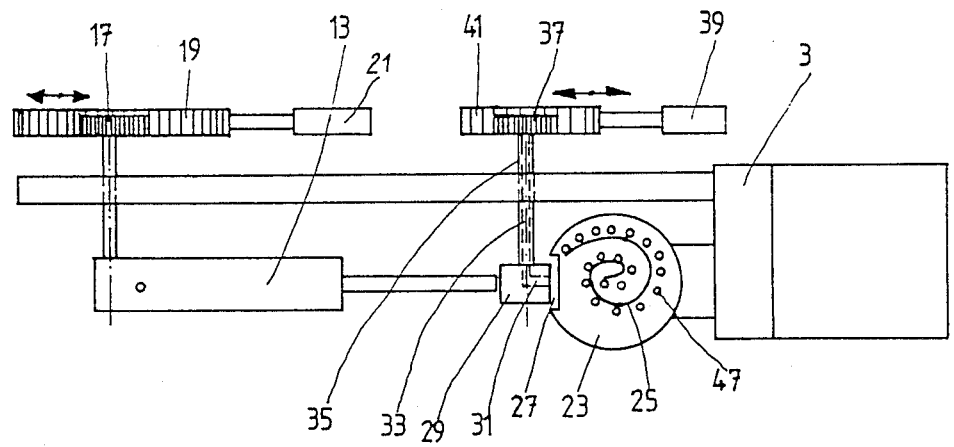
FIG. 3 is a side view of the apparatus.

FIG. 1 shows a working table 1 with a pillar 3. The pillar 3 projects above the table 1 and at its upper end has a cantilever arm 5 which extends at least as far as the middle of the table 1. A gripper 9 is fixed to the end of the cantilever arm 5 on a rotatably mounted shaft 7. The gripper 9 substantially comprises a tubular punch member 15 which at the tip has a suction opening 11 and which is slidably mounted in the gripper 9 and which is connected to a suction source in the pillar 3. The gripper 9 and the punch member 15 may be in the form of a piston-cylinder unit and the displacement of the punch member 15 in the gripper 9 may be produced in known manner by means of compressed air. The gripper 9 and the member 15 together form a linear drive unit 13. Carried on the rearward end of the shaft 7 on the back of the cantilever arm 5 is a gear 17 which meshes with a displaceable rack 19 which is guided along the cantilever arm 5. The rack 19 is connected to a linear drive 21 and is longitudinally slidably guided thereby. Secured to the arm 5 or the pillar 3 is a funnel-shaped shaker 23 of known construction, with a bead or projection 25 extending in a spiral configuration on the inside wall thereof, the shaker device 23 being in the form of a storage means for decorative elements 47. At one location the wall of the shaker device has a vertical slot 27 into which engages a disc 29 mounted rotatably on a shaft 35. The periphery of the disc 29 is flush with the inside wall of the shaker device 23 and is provided with a radial bore 31 which is also connected to the suction source in the pillar 3. The bore 31 and the suction source are connected by an axial bore 33 in the shaft 35 carrying the disc 29. The shaft 35 is rotatable through 180° by means of a gear 37 which is carried on the shaft and a rack 41 which is displaceable by a linear drive 39. Instead of the linear drives 21 and 39, it is also possible to use stepping motors (not shown) with which the gripper 9 and the disc 29 respectively can be rotated by means of chains or toothed belts.

The opening 11 at the end of the punch member 15 is disposed at a small spacing from the periphery of the disc 29 when the gripper 9 is pivoted upwardly. Disposed perpendicularly beneath the pivot axis (shaft 7) of the gripper 9, in an opening 43 in the table 1, is a heating plate 45 formed by the end face of a cylindrical heating element 44. The surface of the heating plate 45 is slightly larger than the contact surface, which is coated with hot adhesive, of a decorative element 47, for example a piece of glass which is ground in a part-spherical shape, referred to as a stone.

Decorative elements 47 are applied by means of the steps which will now be described in greater detail:

Due to the vibrations generated in the shaker device 23, the decorative elements 47 disposed therein move upwardly in succession in an orderly manner in a spiral configuration on the projection 25 and pass into the right position for being taken over by the disc 29 (contact surface directed towards the disc 29) relative to the slot 27. There, they are sucked and held against the opening of the bore 31 in the periphery of the disc 29, with the contact surface coated with the hot adhesive. The disc 29 is now rotated by the linear drive 39 until the decorative element 47 is disposed in front of the opening 11 at the tip of the upwardly pivoted punch member 15. Due to the suction force at the opening 11, the decorative element is sucked thereagainst and held fast at the ground portion thereof. While the disc 29 is being turned back into the initial position in order to pick up a fresh decorative element 47, the punch member 15 moves into a vertical position. The tip of the punch member 15 with the decorative element 47 held thereto is now at a small spacing, for example a few millimetres, from a flat textile article 49 to be decorated, lying on the table 1, and is precisely above the heating plate 45. The punch member 15 is now extended downwardly out of the gripper 9 until the decorative element 47 comes fully into contact against the heating plate 45, with the article 49 lying below the decorative element 47. The pressing time depends on the size of the decorative element 47, the nature of the hot adhesive and the properties of an article 49 lying between the decorative element 47 and the heating plate 45, and can be set by means of a clock 51 on the pillar 3. The temperature of the heating plate 45 can also be set and regulated so that it is possible to apply decorative elements to flat articles 49 which are very sensitive to heat, without giving rise to the danger of shrinkage outside the contact area. The surface of the heating plate 45 is preferably disposed somewhat below the plane of the table 1 so that it cannot come into contact with the flat article 49 prior to the operation of applying the decorative element 47.

It will be appreciated that it is also possible to use a storage means from which the decorative elements 47 can be taken directly by the punch member 15. The linear drive unit 13 in the gripper 9 may be of service in that respect. In that embodiment care should be taken to ensure that the decorative elements 47 are held in the storage means in readiness for the punch member 5, with the top side thereof, so that they can be fitted without any intermediate member. Arranged below the opening 43 for the heating plate 45 or above the flat article 49 is a light source 53 by means of which the position of the heating plate 45 under the flat article 49 can be made visible by means of a spot of light. In that way the operator can position the article 49 over the heating plate 45 while the punch member 15 is being charged with a decorative element 47.

It will be appreciated that it is also possible for the flat article 49 to be clamped in a frame (not shown) and to be moved on the table 1 with an automatic guide arrangement. With automatic guidance of the material, it may be expedient to connect a plurality of applicator devices in parallel thereby to increase the output thereof by a multiple. A plurality of devices connected in parallel may also have a common drive for producing the pivotal movements of the grippers 9 and the discs 29.

Instead of a heating plate 45 which is arranged in the table 1 under the flat article 49 to be decorated, a heating element (not shown) may be fitted in the disc 49 and/or at the tip of the gripper 9; that heating element heats the decorative element 47 during transporation thereof from the shaker device 23 to the flat article 49 on the table and softens the adhesive on the contact surface thereof to such an extent that the decorative element can be stuck to the flat article 49 while the pressure is applied thereto.

It is also possible for the gripper 9 not to be pivotable and for the decorative elements 49 to be fed individually to the raised punch 15 by means of a feed device (not shown).

What is claimed is:

1. Apparatus for applying decorative elements which are covered with a hot adhesive on one side to a flat article lying on a table, comprising a heating element for heating the hot adhesive and a means for pressing the decorative element on the flat article characterised by the combination of the following features:
    (a) a gripper (9) with a punch member (15), the gripper being arranged above the table (1) on a horizontal axis (7) and being pivotable by means of drive member (21) into an upper and a lower limit position,
    (b) a shaker device (23) for isolating the individual decorative elements,
    (c) a rotatable disc (29) which is arranged between the tip of the punch member in the upper limit position of the gripper and the shaker device and which engages into the shaker device and which has a bore (31) terminating at its periphery and communicating with a suction source for sucking thereagainst and holding thereat a decorative element (47) which is isolated in the shaker device (23),
    (d) wherein a decorative element can be guided from the shaker device to the tip of the punch member (15) by a rotary movement of the disc (29) and from there can be guided on to the flat article by pivotal movement of the gripper into the lower limit position, and
    (e) a heating element (44) with a heating plate (45) arranged under the gripper (9) in an opening (43) un the table (1).

2. Apparatus according to claim 1 characterised in that a light source (53) is arranged in the opening (43) or on a cantilever arm (5) carrying the gripper (9).

3. Apparatus according to claim 1 characterised in that the surface of the heating plate (45) lies below the surface of the table (1).

* * * * *